United States Patent [19]

Gibson et al.

[11] Patent Number: 4,546,389
[45] Date of Patent: Oct. 8, 1985

[54] VIDEO DISC ENCODING AND DECODING SYSTEM PROVIDING INTRA-FIELD TRACK ERROR CORRECTION

[75] Inventors: Walter G. Gibson, Princeton, N.J.; Michael A. Plotnick, Southampton, Pa.; Thomas Y. Chen, Flemington, N.J.

[73] Assignee: RCA Corporation, Princeton, N.J.

[21] Appl. No.: 567,524

[22] Filed: Jan. 3, 1984

[51] Int. Cl.[4] .................................................. H04N 5/781
[52] U.S. Cl. .................................... 358/342; 358/907; 369/43; 369/50; 369/59
[58] Field of Search .............. 360/8, 9.1, 10.1, 10.2, 360/27, 32; 369/43, 44, 46, 48, 50, 59, 111; 358/342, 336, 327, 907

[56] References Cited

U.S. PATENT DOCUMENTS

4,455,635 6/1984 Dieterich ............................. 369/59
4,488,278 12/1984 Dieterich ............................. 369/50

Primary Examiner—Donald McElheny, Jr.
Attorney, Agent, or Firm—P. J. Rasmussen; P. M. Emanuel; R. G. Coalter

[57] ABSTRACT

Video disc track numbers are conveyed during each video line by means of a quadrature phase shift keyed data carrier recorded along with the picture and sound carriers on a video disc. Upon playback, the data sequence is processed to identify tracking errors occurring within each video field to thereby enable immediate correction of disc tracking errors on a line-by-line basis thus minimizing picture and sound interruption caused by intra-field tracking errors.

4 Claims, 7 Drawing Figures

VIDEO DISC ENCODING AND DECODING SYSTEM PROVIDING INTRA-FIELD TRACK ERROR CORRECTION

FIELD OF THE INVENTION

This invention relates to video disc systems and particularly to systems wherein field identification numbers are recorded in the vertical blanking interval and recovered upon playback of the disc to facilitate track error correction.

BACKGROUND OF THE INVENTION

Video disc players have inherent advantages in playing back video programs as compared with video tape players, e.g., the ability to quickly access the recorded information, relatively low replication costs, relatively simple mechanical requirements, etc. This, unfortunately, is accompanied by a basic disadvantage relating to tracking errors. Specifically, a forward or backward skip of one track on a helical scan VTR results in only a one field error in the location of the pick-up transducer. A single skip of one track convolution in a presently available video disc player (e.g., the RCA model SJT-100 results in an eight field error in the recovered signal. In another known player a skip of one track results in a two field error for disks recorded at a constant angular velocity.

It is known that one may correct tracking errors in a video disc player on a field-by-field basis, thereby placing video disc players on a par with video tape players. As an example, in U.S. Pat. No. 4,313,134 of Rustman, et al., a video disc system is disclosed wherein field numbers are recorded in pulse code modulation (PCM) form during the vertical interval of each video field. This has become known as a digital auxiliary information code (hereinafter DAXI code). Tracking errors (e.g., locked or skipped grooves or information tracks) are detected in a player by noting an improper sequence of two or more decoded DAXI field numbers. Correction of the error is provided by means of a transducer deflector (e.g., a stylus "kicker" solenoid or piezoelectric element) which radially translates the pick-up transducer in a direction to reduce the tracking error until such time as the field numbers again form an orderly sequence. Other patents relating to the DAXI code, its generation, recovery and use in video disc player include U.S. Pat. No. 4,308,557 of C. B. Dieterich, U.S. Pat. No. 4,307,418 of Mindel et al. and U.S. Pat. No. 4,309,721 of Christopher.

Heretofore it has been recognized that a need exists for correction of tracking errors in video disc systems on a more frequent basis than the field-by-field (inter-field) basis provided in known video disc systems. Such a system is described by C. B. Dieterich in his U.S. patent application Ser. No. 556,444 filed Nov. 30, 1983, entitled "VIDEO DISC ENCODING AND DECODING SYSTEM PROVIDING INTRA-FIELD TRACK ERROR CORRECTION".

In the Dieterich system, a method for forming a video disc recording signal, for facilitating intra-field track error correction, comprises providing a video signal and a data sequence representative of field numbers. The video signal, the data sequence and a subset of the data sequence are processed to form a recording signal with the subset data sequence conveying partial tracking information on a line-by-line or plural line basis within each field.

In a specific example of the Dieterich encoding system, the "partial" tracking data is conveyed by means of quadrature phase shift keying (QPST) of a subcarrier with local groove number (LGN) data and adding the QPSK signal to the mastering signal during a portion of the horizontal blanking interval for subsequent recovery in a video disc player. The player includes means for comparing an anticipated track number (from the recovered subsets) with the actual track number (from the corresponding portion of the full field number) to develop an error signal for radially translating the player pickup transducer in a sense to correct tracking errors when the numbers differ.

SUMMARY OF THE INVENTION

It is an advantage of the Dieterich system that the LGN data, being sent during a portion of the horizontal blanking interval, has little likelihood of interfering with the "active video" or displayed portion of the video signal when the disc is played back and viewed on a television receiver. However, the bandwidth requirement is relatively high due to the limited transmission time available, and the additional signal occurring in close proximity to the horizontal sync pulse may perturb the sync.

It is an object of the present invention to provide improvements in systems of the general kind described to increase both the data transfer rate and the data detection reliability and, at the same time, reducing the system bandwidth requirements.

In accordance with the invention, a method for forming a video disc recording signal for facilitating intra-field track error correction upon subsequent playback of video disc records recorded with the disc recording signal comprises the steps of providing a video signal inclusive of a data sequence representative of field numbers of said video signal and providing a subset of said data sequence representative of track identification numbers. The subset is encoded on a carrier wave by quadrature phase shift keying and the video signal is frequency modulated on a second carrier wave. The two carrier waves are then combined to form the disc recording signal.

A video disc player embodying the invention for use with disc records recorded with a signal manifestation including a first data component representative of video field numbers and a quadrature phase shift keyed carrier wave having four signaling intervals per line of said video signal, the first interval conveying a reference phase component, the remaining signaling intervals conveying a subset of said video field numbers corresponding to a track identification number comprises a recovery means for recovering the first data sequence from the recorded signal manifestation. A quadrature phase shift keyed demodulator means responsive to the reference phase component demodulates the subset of the video field numbers. A data register means stores the demodulated subset of the video field numbers which are compared by a data processing means with the first data sequence for developing an intra-field track error correction signal that is applied to the signal recovery means in a sense to reduce tracking errors occurring within a field of the video signal.

DETAILED-DESCRIPTION

Figure 1:
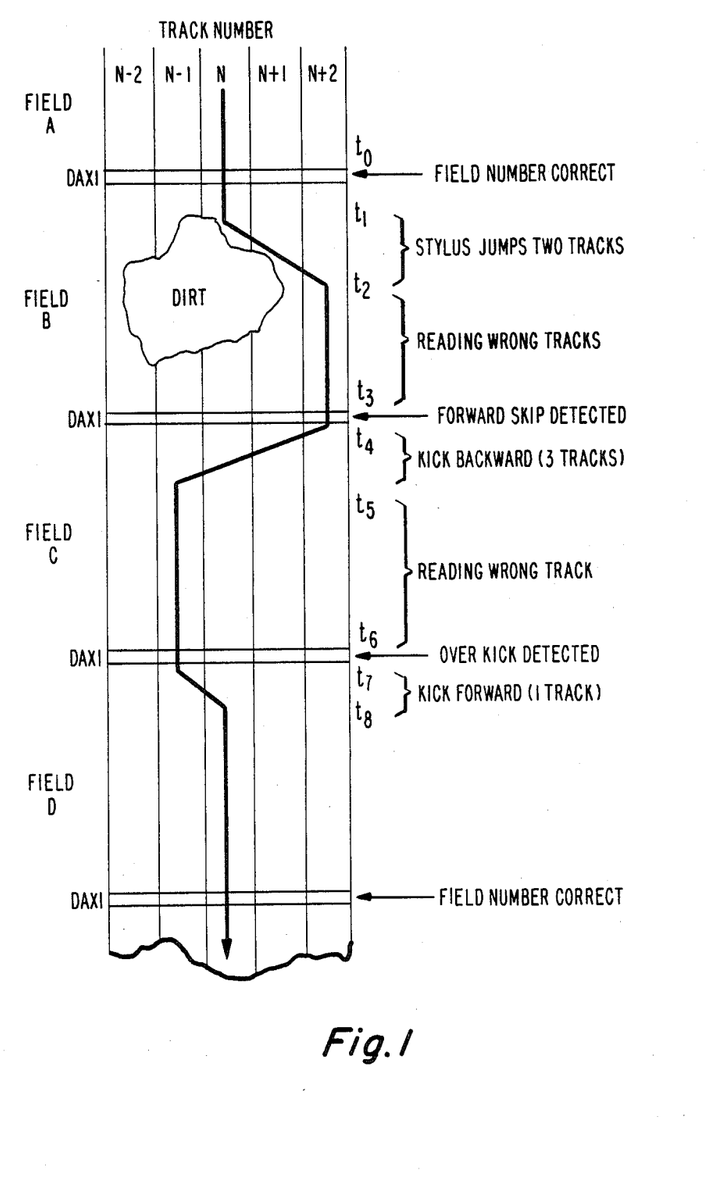
FIGS. 1 and 2 are plan views of a portion of a video disc record showing the locus of travel of a pick-up stylus in a disc player having field-by-field (inter-field) track error correction (FIG. 1) and line related track error correction in accordance with the invention (FIG. 2)
Figure 2:
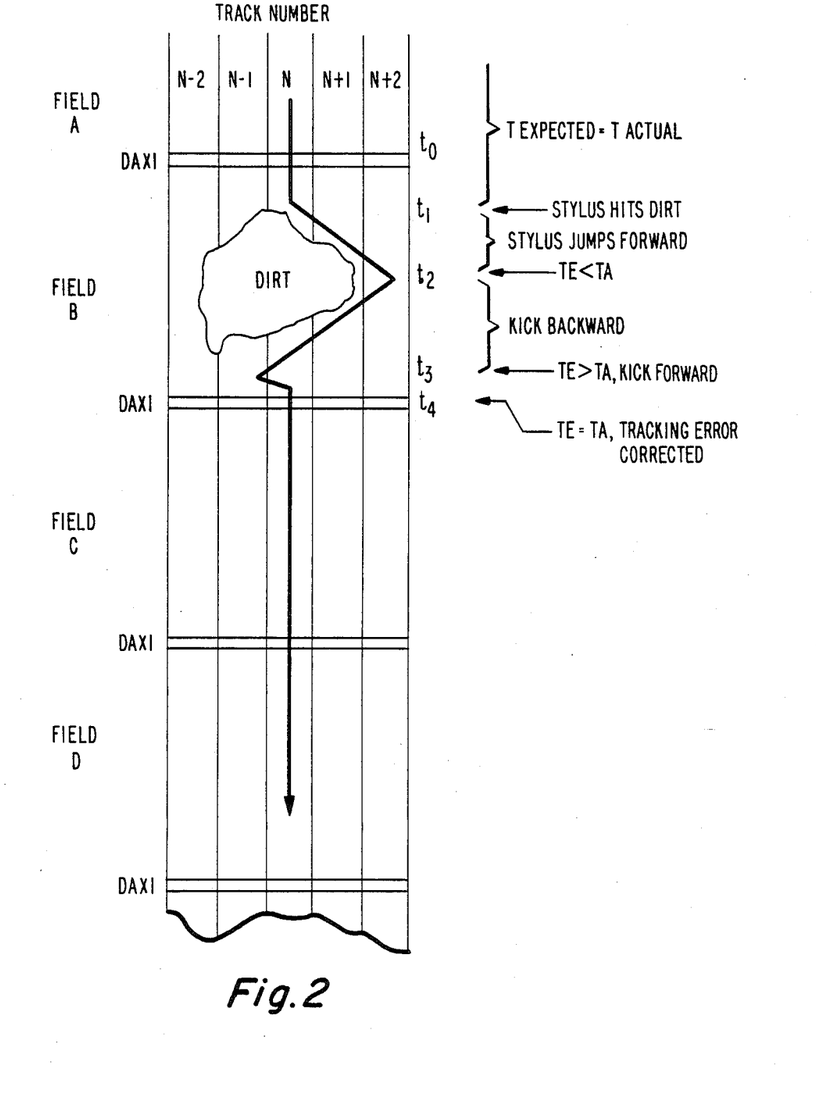

FIGS. 1 and 2 provide a comparison of a field-by-field track error correction method (FIG. 1) with the line-by-line correction method of the present invention (FIG. 2). In FIG. 1, five adjacent tracks of a disc record are shown along with the locus (path) of travel (dark arrow) of a signal recovery stylus. The term "track", as used herein, means an information conveying path on a disc and may be formed in a spiral or in concentric circles. The stylus is initially in track number N of field A at time t−0 and is lofted from the disc at time t−1 upon encountering a particle of dirt spanning tracks N−2, N−1 and N. At time t−2 the stylus lands in track number N+2 and continues in that track until the beginning of the next field (field C). Since the stylus has been radially translated by two tracks, the true tracking error amounts to a total skip of sixteen fields in a disc system where there are eight fields per disc convolution.

To correct the tracking error, the DAXI field number code recovered in the vertical interval of field B is compared with the code for field C which is recovered at time t−3. A kick pulse is applied to the stylus at time t−4 which, for illustrative purposes, results in an overkick in the interval t−4 to t−5 to track number N−1. The overkick is corrected in a similar fashion in field D until the stylus is again tracking the correct track N.

As seen, in this hypothetical example, the total time lost during track error correction amounts to about two fields. Even if the overkick had not occurred in field C, the disruption in the video signal would amount to about one field which would be visible in the displayed video image and audible in the reproduced sound. It is desirable to reduce the duration of the disruptions and thus increase the "fidelity" of the recovered image.

FIG. 2 illustrates the improvement which may be obtained when track error correction is provided on a line-by-line basis in accordance with the invention using information specially encoded in a QPSK carrier added to the system for conveying intra-field track error correction data. As shown, the two corrections for traversing the dirt particle are accomplished well within the time frame of one field. For purposes of illustration, the size of the dirt particle is greatly exaggerated. In practice most disc defects are quite small relative to the physical dimension (length) of one field and so corrections may be made within a few lines. It should be noted from FIG. 1, however, that even a small defect in a disc with field-by-field track error correction can nevertheless result in a track error approaching one entire field or more in length.

Figure 3:
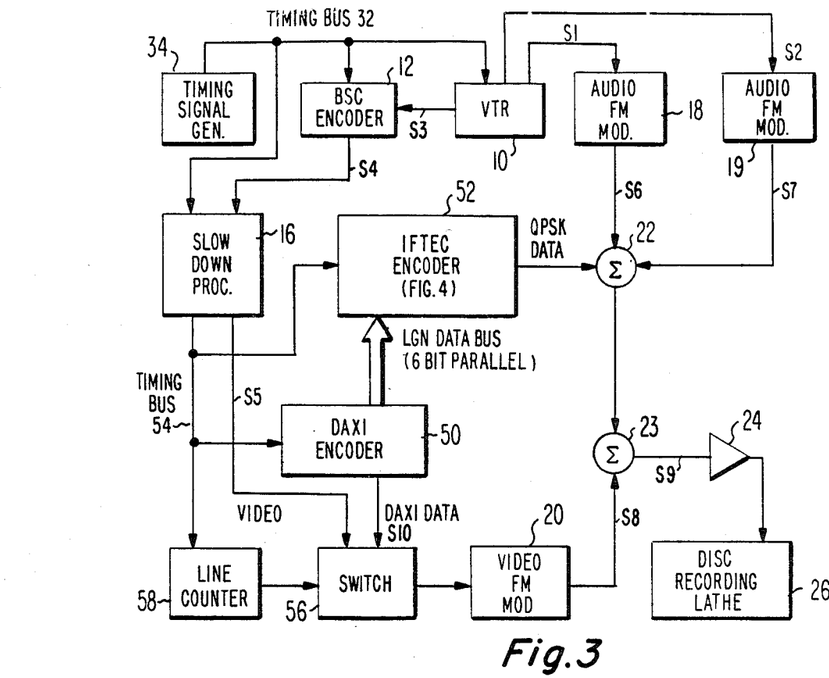
FIG. 3 is a block diagram of a video disc recording system embodying the invention.

The video disc mastering system of FIG. 3 includes a video tape recorder 10 for providing a source of audio signals S1 and S2 and a video signal S3 to be recorded. Recorder 10 is preferably a slow motion recorder provided with automatic scan tracking (AST) to facilitate mastering at half rate (one half normal playback speed) using the skip field mastering technique described in detail in U.S. Pat. No. 4,277,796 of M. Ross entitled "SLOW DOWN COLOR PROCESSOR FOR VIDEO DISC MASTERING USING A SPECIAL MODE VTR". The video signal S3 is applied to a buried subcarrier (BSC) encoder 12 which, preferably, is of the type described in U.S. Pat. No. 3,872,498 of Pritchard. In the BSC format used in FIG. 3, chrominance information is represented by a color subcarrier of the general form employed in the well known NTSC format which is buried in a lower portion of the video band rather than being located in the high end of the luminance signal band. An illustrative subcarrier frequency choice is in the vicinity of 1.53 MHz with the color subcarrier sidebands extending plus or minus 500 KHz thereabout and with the luminance signal band extending well above the highest color subcarrier frequency (to 3 MHz, for example).

The BSC encoded video signal S4 is applied to a video slow down processor 16 which preferably is of the type described in the Ross patent. Briefly, in the Ross system selected fields of the redundant field (slow motion) video signal S4 are stored in a memory in processor 16 at a standard clock rate and recovered at a lower clock rate that is inversely proportional to the number of times each field is repeated so as to produce a non-redundant video output signal (S5 here) of reduced bandwidth. The bandwidth of the audio signals S1 and S2 is reduced by the same factor as the video signal (one half) during operation of recorder 10 in the slow motion mode. The audio signals S1 and S2 and the processed video signal S5 are applied to respective frequency modulators 18, 19 and 20 and the resultant frequency modulated signals S6, S7 and S8 respectively, are combined in a summing circuits 22 and 23 to form a resultant composite recording signal S9 processing the full informational content of the original audio and video signals. The recording signal S9 is applied via an amplifier/equalizer 24 to the cutterhead of a recording lathe 26. The turntable of lathe 26 is rotated by a drive motor (not shown) which receives half-rate drive signals produced by processor 16 whereby full bandwidth master recordings may be made with a cutterhead of lesser bandwidth.

Synchronization of recorder 10, encoder 12, and processor 16 is provided by means of a timing bus 32 supplied with timing signals (e.g., vertical, horizontal, color subcarrier, etc.) produced by a timing signal generator 34. A generator suitable for producing NTSC format standard video timing signals is the Tektronics Model 146 NTSC Test Signal Generator. (For mastering in other formats such as PAL or SECAM an appropriate generator should be used).

The remaining elements of the mastering system encode digital data for recording along with the video and audio signals on lathe 26. Two data encoders are provided, namely, a DAXI data encoder 50 and an intra-field track error correction (IFTEC) encoder 52. The encoders receive "half rate" timing signals from a bus 54 from slow down processor 16. The "half rate" timing signals include horizontal blanking pulses (HB/2), vertical field pulses (FV/2), horizontal sync pulses (HS/2) and the buried subcarrier reference frequency (FBSC/2). DAXI data encoder 50, illustratively, is of the type described in the aforementioned patent of Dieterich and the other patents relating to DAXI coding and provides video field and band numbers and other suitable information relating to the video signal produced by recorder 10 (e.g., bits may be assigned to identify monophonic or stereophonic or bilingual material, etc.) As an illustration, field identification numbers may be produced by encoder 50 by counting vertical field pulses provided via bus 54 from processor 16.

The DAXI data signal S10 is inserted in place of the video signal S5 on lines 17 and 280 of each frame by means of a multiplex switch 56 interposed between processor 16 and video FM generator (modulator) 20. Switch 56 is controlled by a line counter/decoder 58 coupled to bus 54. Normally, switch 56 couples the video signal S5 to generator 20 but changes over to couple the DAXI signal S10 when the line counter count is 17 or 280. The DAXI signal comprises a 77 bit PCM word synchronized with the buried color subcarrier frequency (about 1.53 MHz at full rate, 1.53 MHz/2 for half rate mastering) to facilitate subsequent detection in a video disc player. Each DAXI word comprises a 13 bit start code (a Barker sequence for data framing) followed by a 13 bit CRC (cyclic redundancy check) error check code and ending with a 51 bit information code. Of the 51 bits in the information code, 6 provide a record band number, 18 provide a video field identification number (each field on a disc side is uniquely identified) and the remaining 27 are currently unassigned but are included to provide information capacity for future expansion or other uses of the DAXI code.

The IFTEC encoder 52 receives timing signals (at half rate for half rate mastering) from bus 54 and 6 bits (parallel) of the 18 bit field identification number from DAXI encoder 50 and supplies a 4 phase, phase shift keyed (PSK) signal representing local "groove" (or track) numbers (LGN data) to a further input of summing circuit 22. The PSK carrier frequency is equal to 63/2 times fH (line frequency). This corresponds to about 496 KHz (real time, half that in half rate mastering) and is fully interlaced vertically and horizontally so as to reduce visibility of the data in displayed images.

The 6 bits selected from the 18 bit field identification number are a particular subset providing identification of 64 least significant "track" or "groove" numbers. A complete track number comprises all bits of the 18 bit field number except the 3 least significant bits (LSBs). The LSBs, in the "capacitance electronic disc" (CED) system uniquely identify the 8 field sectors of the disc. Since it is track convolutions and not sector identification which is of importance to the present invention, the 6 bit subset of the 18 bit field number corresponds to bits 4, 5, 6, 7, 8 and 9 (where the LSB is bit 1 and the MSB is bit 18). This provides identification of 64 grooves within a field, and accommodates stylus skips forward or backward of 32 grooves. Most tracking errors are much less than skips of 32 grooves, a one groove skip being most common.

To correct for intra-field tracking errors in a video disc player, the LGN data is recovered, as will be described, and compared with the corresponding 6 bits conveyed by the DAXI code. If the LGN and DAXI groove (track) numbers are the same, then no error has occurred and no corrective action is needed. Conversely, if the LGN and DAXI numbers differ, then an interrupt signal is sent to the player tracking control microprocessor along with the "difference" number and the player microprocessor supplies "kick" pulses to the pick-up transducer in a sense to reduce the tracking error until the DAXI and LGN numbers agree and the interrupt signal is terminated.

Figure 4:
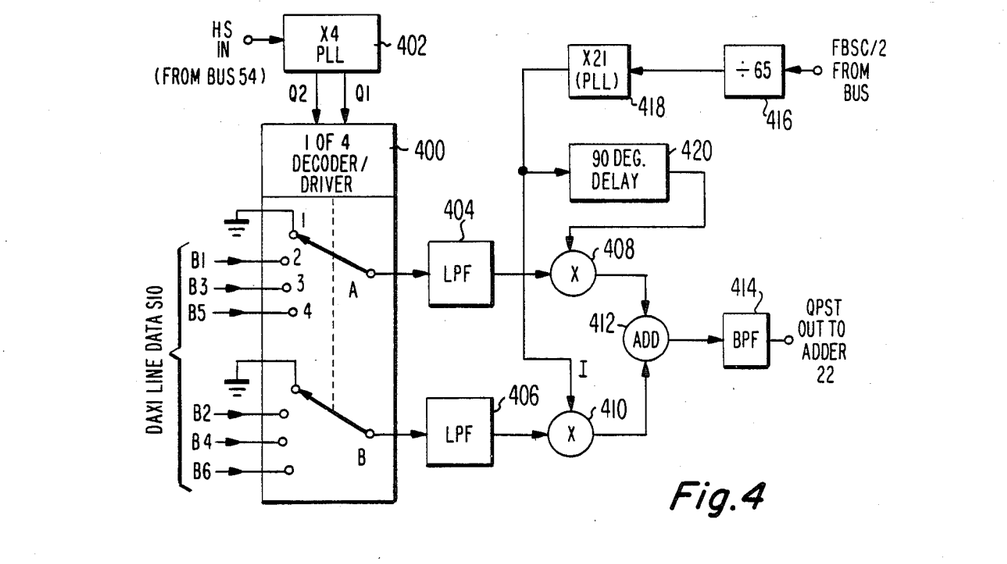
FIG. 4 is a detailed block diagram of an intra-field track error correction (IFTEC) encoder suitable for use in the system of FIG. 3.
Figure 5:
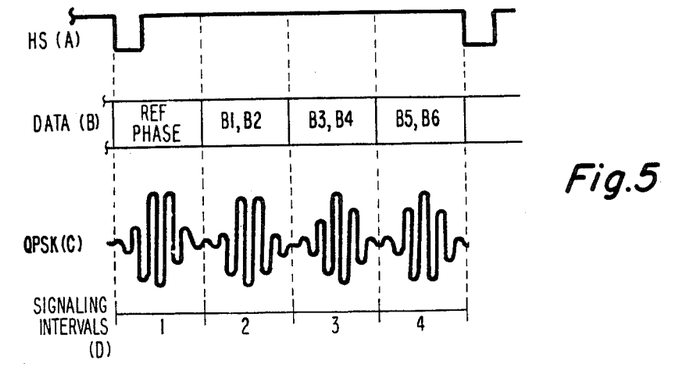
FIG. 5 is a waveform diagram illustrating operation of the system of FIG. 3.

FIG. 4 is a detailed embodiment of a preferred implementation of IFTEC encoder 52. Briefly, the encoder generates four signaling intervals per line (FIG. 5d) aligned with the horizontal sync signal HS (FIG. 5a). The first interval comprises a reference phase signal (496 KHz, below the significant sidebands of lowest sound carrier of 716 KHz) followed by three signaling intervals (2, 3, 4 FIG. 5) conveying the 6 bits of LGN data, 2 bits per interval. To reduce possible picture interference effects the QPSK signal is filtered (FIG. 5c) by low pass filters having a cosine squared response characteristic an a 100 KHz (real time) or 50 KHz pass band for half rate recording.

Turning now to the details of FIG. 4, the encoder includes a 2 channel 4 position multiplex switch 400 (e.g., a type CD 4052 integrated circuit). Section "A" of the switch selects ground (position 1) or bits B1, B3 or B5 in positions 2, 3 or 4, respectively. Section B selects ground (position 1) or bits B2, B4 or B6 in positions 2, 3 or 4 respectively. The switch position is controlled by a ×4 multiplying PLL 402 locked to 4 times the line frequency HS thereby creating four signaling intervals per line. The first interval is always O—O (A and B both grounded) to establish the reference phase by which the QPSK data will later be recovered thus making the LGN data channel independent of the player for purposes of QPSK recovery. The selected data is low pass filtered by a pair of 50 KHz (half rate recording) filters which preferably have cosine squared impulse response to minimize the possibility of picture interference. The filter outputs are then multiplied in multipliers 408 and 410 with quadrature related carriers (495 KHz/2 for half rate recording), added by adder 412, band pass filtered by filter 414 (a bandwidth of 200 KHz is adequate for real time recording, 100 KHz for half rate recording) and applied to adder 22 (FIG. 3) for addition to the sound and picture carriers for recording. The quadrature carriers are provided by a divider 416 which divides the buried subcarrier frequency (FBSC/2) by 65. This is then multiplied by 21 in a multiplying PLL 418 to provide the in-phase carrier "I". The quadrature phase carrier "Q" is produced by delaying signal "I" by 90 degrees with a delay line 420.

Figure 6:
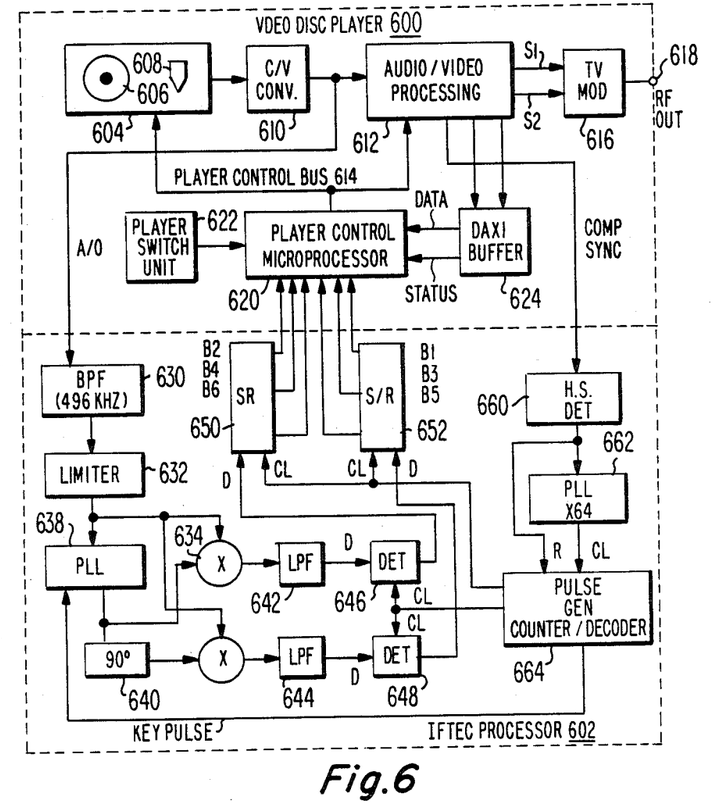
FIG. 6 is a block diagram of a video disc player embodying the invention.

FIG. 6 is exemplary of a video disc player 600 (outlined in phantom) modified by the addition of an intra-field track error correction (IFTEC) processor 602 (also outlined in phantom) to provide the line-by-line track error correction feature of the invention when playing back video disc records mastered as previously described. The player 600 may be of conventional design such as the model SJT-400 CED video disc player manufactured by RCA Corporation. The principles of the invention, of course, may readily be applied to any form of video disc player wherein field or tracking information is conveyed during the vertical interval of a field by a coding system such as the DAXI system or some other suitable system. Of importance to an aspect of the present invention is that there be come form of "primary" coding system for conveying tracking information on a field-by-field basis or at least a frame-byframe basis and a "secondary" coding system for conveying a subset of the primary tracking information on a line basis. In the present system, the intra-field tracking information is conveyed on a one line basis, that is, the tracking information is available during every line throughout each field.

Player 600 includes a turntable mechanism 604 for rotating a video disc record 606 and a pickup transducer 608 for recovering information signal from the disc. In the CED system, the information is stored in the form of topological variations of a spiral information track and recovered by sensing capacitance variations between a stylus in transducer 608 and the record 606. The output of transducer 608 is applied to a capacitance-to-voltage (C/V) converter 610 which produces an FM output signal representative of the recorded information. Such records and suitable circuits for implementing the C/V conversion are well known. See for example, U.S. Pat. No. 3,783,196 (Stanley), U.S. Pat. No. 3,842,194 (Clemens) and U.S. Pat. No. 4,080,625 (Kawamoto et al.).

The FM signal is applied to an audio/video processor 612 which produces a baseband audio output signal S1 and a baseband composite video output signal S2. Processor 612 has an input connected to a player control bus 614 for receiving squelch signals for muting the audio and video signals under certain player operating conditions (e.g., "pause"). Bus 614 also conveys turntable motor and tracking control signals to mechanism 604. Pyles et al., in U.S. Pat. No. 4,286,290 entitled "FAST RECOVERY SQUELCH CIRCUIT FOR A VIDEO DISC PLAYER" which issued Aug. 25, 1981, discloses a suitable implementation of processor 612 which provides timebase error correction circuitry and format conversion circuitry for converting the recovered video signal from the buried subcarrier format proposed by Pritchard in U.S. Pat. No. 3,872,498 to the NTSC format. Carnt et al., in U.S. Pat. No. 4,200,881 describe processors suitable for recording and reproducing composite video signals for PAL format.

The baseband audio and video signals S1 and S2 produced by processor 812 are applied to the sound and picture carrier modulation inputs of a TV modulator 616 which has an RF output terminal 618 for connection to the antenna input terminal of a conventional television receiver for displaying sound and picture information recovered from disc 606. An integrated circuit suitable for use as modulator 616 is the type LM 1889 available, for example, from National Semiconductor, Inc.

A player control microprocessor 620 provides various supervisory and information display control functions. The control functoins (supplied via bus 614) include, illustratively, "stylus kicking" and control of the radial position, elevation, velocity and direction of movement of pick-up transducer 608 relative to disc 606 and squelching of the audio and video signals produced by processor 612. Some of the functions are initiated manually by means of a player control switch unit 622 coupled to an input port of microprocessor 620. Manually initiated functions include, illustratively, play, pause, slow scan forward or reverse, etc. Upon closure of one of the user activated switches in unit 622, microprocessor 620 addresses its internal read only memory (ROM) and fetches an appropriate sequence of instructions resident in the memory for effecting the desired control function.

DAXI information (e.g., field numbers, band numbers, etc. is conveyed to microprocessor 620 by means of a DAXI BUFFER integrated circuit 624 having inputs coupled to receive PCM data and a 1.53 MHz clock signals (FBSC) from processor 612 and having outputs coupled to supply data and a data status flag signal to input ports of microprocessor 620. When a DAXI code word is received without error, the status flag is SET and microprocessor 620 processes the data for machine control purposes (e.g., detecting stop flags or end of record bits) and player display purposes (e.g., calculation of elapsed playing time from the 18 bit field number data). Buffer 624 and microprocessor 620 are commercially available integrated circuits and are described in more detail in the previously mentioned DAXI related U.S. patents.

Buffer 624 is interfaced with a comb filter (not shown) in processor 812 for detecting the PCM DAXI data as described in C. B. Dieterich's U.S. Pat. No. 4,275,416 entitled "PCM DETECTOR" which issued June 23, 1981. For the purposes of the present invention, only two types of signals are needed from video disc player 600 for use in the IFTEC processor 602. They are: the player "arm output" (AO) signal provided by capacitance-to-voltage converter 610; and a horizontal sync (HS) output signal provided by a sync detector (not shown) in processor 612.

The arm output AO signal is applied to a bandpass filter 630 which passes the QPSK LGN data (496 KHz) to a limiter 632 and from there to a pair of multipliers 634, 636 and to a keyed phase locked loop 638. Loop 638 is keyed to lock to the reference phase occurring during the first quarter of each line (FIG. 5) and provides an inphase signal to demodulator (multiplier) 634 and a quadrature phase signal (delayed 90° by delay line 640) to multiplier 636. The multiplier outputs are low pass filtered (e.g., 100 KHz) by filters 642 and 642 and the filtered data signals are then applied to a pair of detectors 646 and 648. These detectors may comprise a pair of "D" or data flip flops clocked at four times line rate with the clock pulses shifted by one eighth line to thereby sample the filter outputs in the middle of each signaling interval.

The outputs of detectors 646 and 648 comprise the odd and even bits of the LGN data and are coupled to respective shift registers 650 and 652 for conversion of the serial data to parallel (6 bit) form. Registers 650 and 652 receive clock signals similar to those applied to flip flops (detectors) 646 and 648 but delayed by a few microseconds to assure that the data is stable before being shifted into the registers. All clock signals and the keying pulse for PLL 638 are synchronized with the player horizontal sync signal HS which is detected from the player composite sync signal in a HS sync detector 660 (e.g., a 0.7H monostable multivibrator), multiplied by 64 in a multiplying PLL 622 and applied to a counter 664 (reset by HS) which includes decoders (not shown) to produce the clock and key signals at the times previously noted.

The LGN data is applied to microprocessor 620 where it is subtracted from the corresponding data conveyed by the DAXI code. If no tracking error has occurred, the LGN data recovered from the IFTEC processor 602 should be exactly the same as the corresponding dtaa recovered by the DAXI system in the player. If so, the result of the subtraction of the LGN data bits from the DAXI data bits will be zero indicating that no tracking error has occurred. If, however, a tracking error has occurred, microprocessor 620 enters an interrupt service routine and begins sending "kick" pulses to transducer 608 via control bus 614 to radially translate the signal recovery stylus of the transducer in a sense and by the indicated number of track convolutions to reduce the tracking error. The interrupt service routine in microprocessor 620 may comprise, illustratively, a jump instruction to the existing track error correction routine already resident in the microprocessor for servicing DAXI detected tracking errors.

Figure 7:
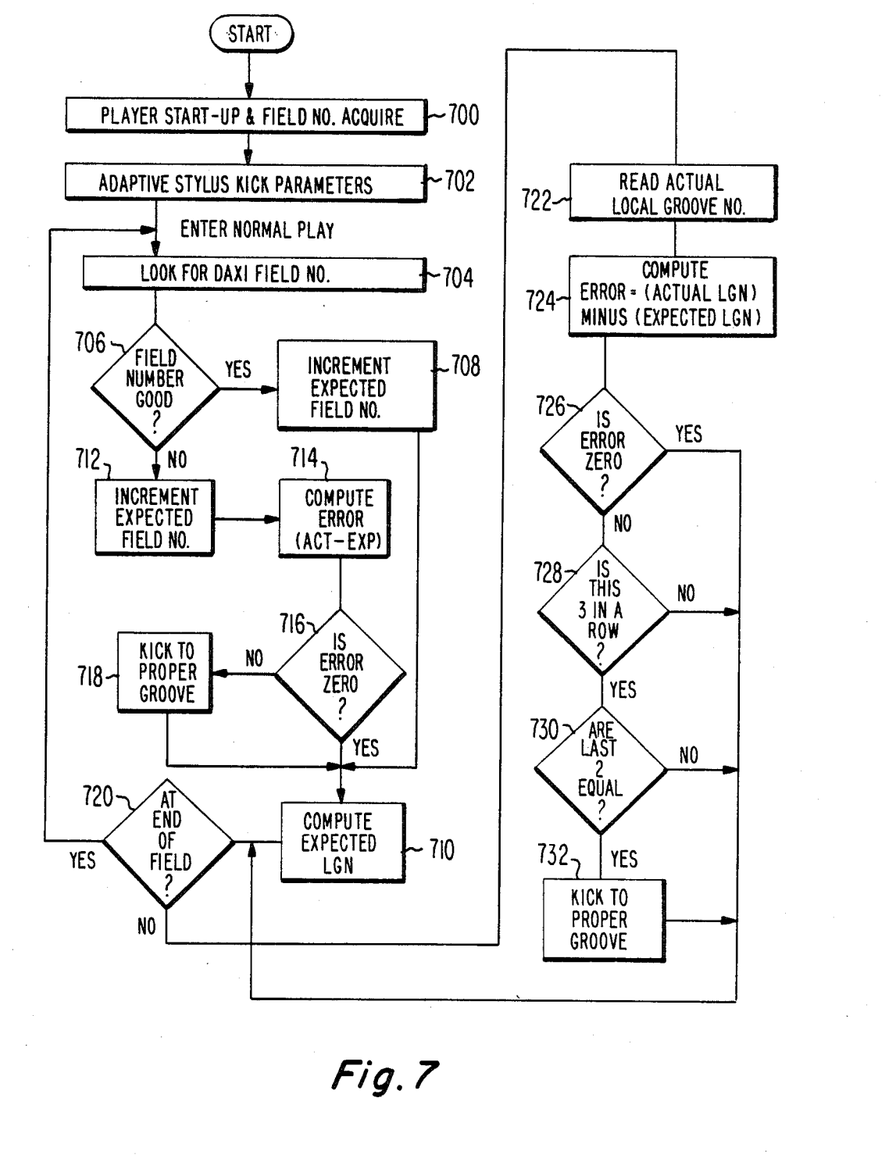
FIG. 7 is a program flow chart suitable for use with the player control microprocessor of FIG. 6.

In order to improve the validity or "integrity" of the local "groove" or track numbers recovered from the player sound carriers, microprocessor 620 may be reprogrammed as indicated in the flow chart of FIG. 7 rather than use the interrupt routine previously described. The program begins with a conventional start-up routine (boxes 900, 902) described in the previously mentioned DAXI patents which include a detailed machine state diagram. When the player enters the "enter normal play" state the first subroutine step is to "look for DAXI field number" (704) which, in the player of FIG. 6 comprises simply monitoring the DAXI status flag produced by buffer 624. In the well known DAXI system, all fields are numbered in sequence. The next stage of the program is to verify the sequence since it is possible to receive a valid DAXI code but, due to a skip for example, the field number may be out of sequence. Accordingly, the first test (box 706) is to determine if the field number is "good" (in sequence). If so, the current field number is incremented (708) and the program continues to compute the "expected local groove number" (710). This involves storing the 6 bits of the DAXI field number that are greater (more significant) than the 3 LSB's (which identify the 8 disc sectors).

If the field number test (906) is "bad" then the "expected" number is incremented (712) and the difference between the actual DAXI number and the expected number is computed (by subtraction, 714) to determine the magnitude and direction of the error. If, in fact, no error is present (difference zero, 716) the program continues to compute the expected LGN (710), else the program causes the microprocessor to send kick pulses to transducer 608 to radially translate to the correct groove (716) and then continues on to 710 to compute the expected LGN number, as mentioned. Then a test is performed to determine if the end of field has been reached (720, counting field lines). If so, then the program branches back to the "enter normal play" point and steps 704–720 are repeated. If it is not the end of a field, then the program enters a branch which operates on the LGN data from unit 602 to provide intra-field track error correction tests and to provide correction action, if needed.

The read LGN step 722 is provided by registers 650 and 652 in unit 602 and the computation (comparing) step (624) is provided by subtraction in processor 620. If the subtraction of the DAXI groove number from the LGN data of unit 602 is zero (726) then the program assumes that no tracking error has occurred and branches back to the end of field test (720). If not zero, a test is performed (728) to determine if the errors have occurred three times in a row. If not, there is a branch back to the end of field test 720. If so, a test is performed (730) to determine if the last two readings were equal. If not, there is a branch back to the end of field test. If so, the program enters a kick routine 732 to radially translate the signal recovery transducer 608 to the groove number indicated by unit 602.

What is claimed is:

1. A method for forming a video disc recording signal for facilitating intra-field track error correction upon subsequent playback of disc records recorded with said disc recording signal comprising the steps of:
    (a) providing a video signal inclusive of a data sequence representative of field numbers of said video signal;
    (b) providing a subset of said data sequence representative of track identification numbers;
    (c) encoding said subset of said track identification numbers by quadrature phase shift keying a carrier wave;
    (d) frequency modulating a second carrier wave with said video signal;
    (e) combining said quadrature phase shift keyed carrier wave with said frequency modulated carrier wave to form said disc recording signal.

2. The method recited in claim 1 wherein said quadrature phase shift keyed carrier wave comprises four signaling intervals during each line of said video signal, the first interval conveying a reference phase signal, the remaining three conveying a total of six bits of binary data representative of said subset of said data sequence conveyed by said video signal.

3. A video disc player for use with video disc records recorded with a signal manifestation including a video signal inclusive of a first data component representative of video field numbers and a quadrature phase shift keyed carrier wave haivng four signaling intervals per line of said video signal, the first interval conveying a reference phase component, the remaining signaling intervals conveying a subset of said video field numbers corresponding to a track identification number repeated within each field of said video signal, comprising:
    (a) recovery means for recovering said first data sequence from said recorded signal manifestation;
    (b) quadrature phase shift keyed demodulator means responsive to said reference phase component for demodulating said subset of said video field numbers;
    (c) data register means for storing said demodulated subset of said video field numbers;
    (d) data processing means for comparing said subset of said video field numbers with said first data sequence for developing an intra-field track error correction signal; and
    (e) means for applying said intra-field track error correction signal to said recovery means in a sense to reduce tracking errors occurring with a field of said video signal.

4. A video disc player as recited in claim 3 wherein said data processing means comprises microprocessor means programmed to provide at least one test of said subset of said field numbers prior to producing said tracking error correction signal so as to prevent erroneous radial translation of said recovery means in the event of invalidity of said subset of said field numbers.

* * * * *